Oct. 16, 1951     O. K. HOBBS     2,571,449
RESILIENT MOUNTING FOR CHASSIS OF MOTOR VEHICLES
Filed Dec. 22, 1948     2 Sheets—Sheet 1
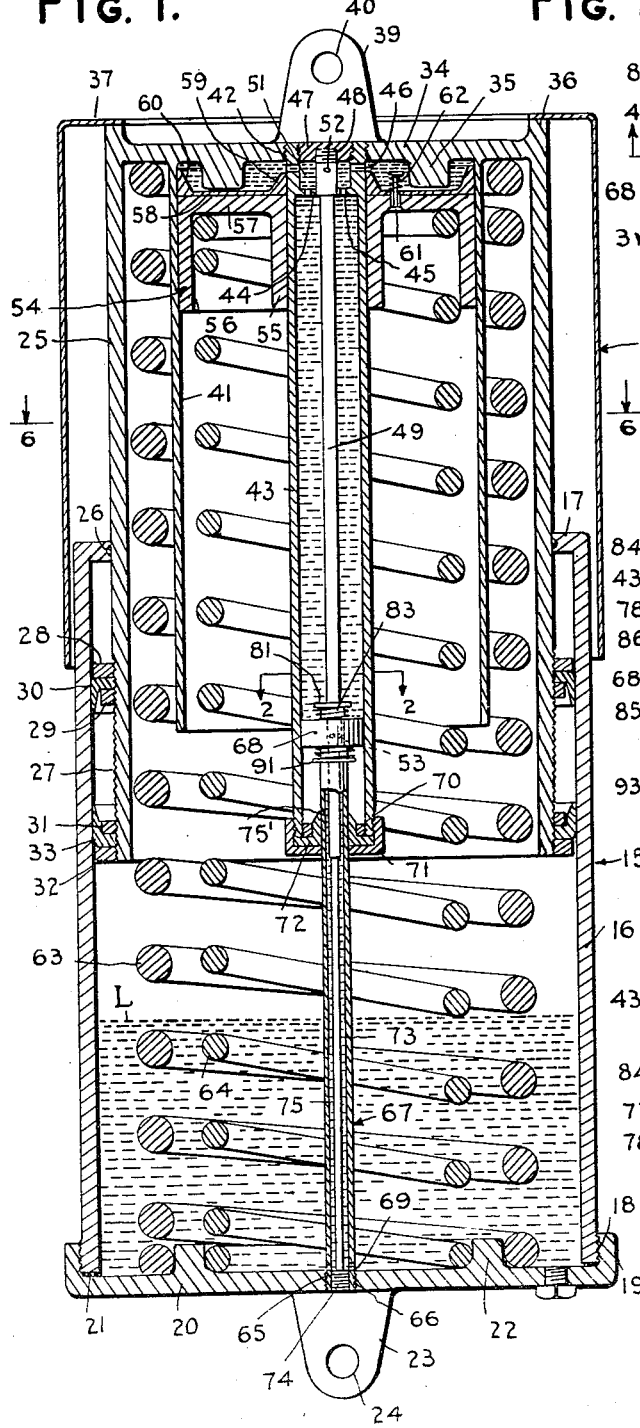
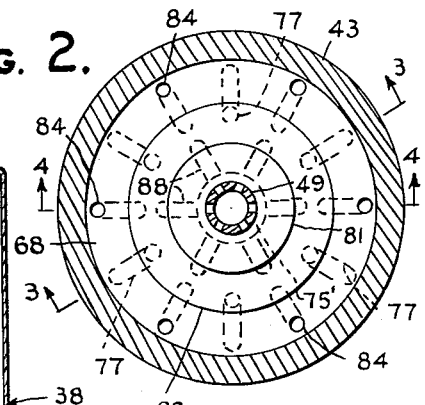
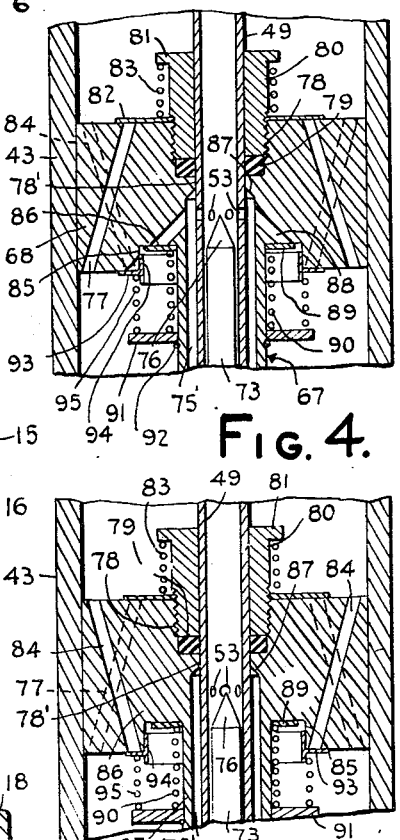
INVENTOR.
OLIVER K. HOBBS
BY
ATTORNEY Oct. 16, 1951      O. K. HOBBS      2,571,449
RESILIENT MOUNTING FOR CHASSIS OF MOTOR VEHICLES
Filed Dec. 22, 1948      2 Sheets-Sheet 2
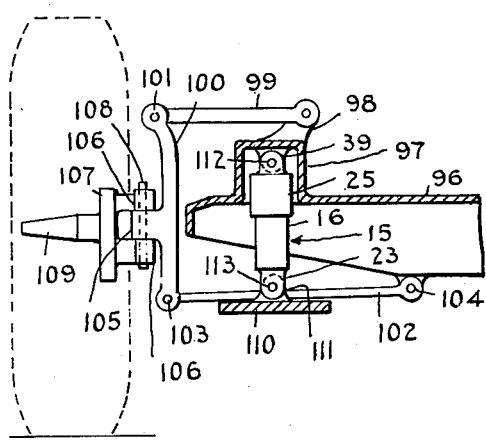
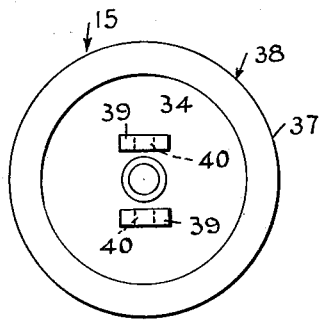
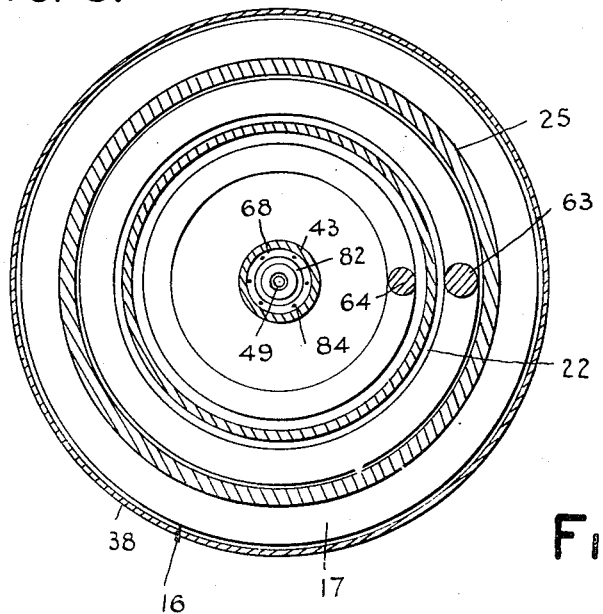
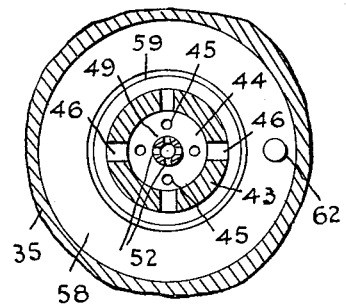
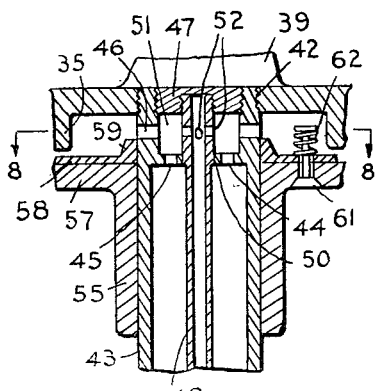
INVENTOR
OLIVER K. HOBBS
BY
ATTORNEY Patented Oct. 16, 1951

2,571,449

UNITED STATES PATENT OFFICE 2,571,449

RESILIENT MOUNTING FOR CHASSIS OF MOTOR VEHICLES

Oliver K. Hobbs, Suffolk, Va.

Application December 22, 1948, Serial No. 66,654

9 Claims. (Cl. 267—60)

My invention relates to a resilient mounting for the chassis of motor vehicles.

All automobiles must be provided with springs designed to withstand a maximum load to be placed upon the chassis, and at the same time allow reasonably good riding qualities at the minimum load. In the case of certain light or undersized automobiles, this is very difficult to accomplish. If the maximum load is, for example, 2,000 pounds, the springs must be designed to accommodate that load, and it is probable that they will be too stiff at the minimum load of say 1,000 pounds, and the ride at such minimum load will be uncomfortable. In heavier cars this condition is not as noticeable, but the problem still exists. If the spring mounting is sufficiently light or resilient to produce a comfortable ride at the minimum load, it is probable that it cannot carry the maximum load, and the mounting will be rigid at the maximum load, instead of resilient.

It is accordingly a primary object of my invention to solve the above stated problem, and in accordance with the invention, I propose to use two springs which together are sufficiently soft or resilient to provide comfortable riding under minimum load conditions, with automatic means provided for applying a differential compression to one spring, in accordance with increases in the load, so that the combined strength of the two springs will produce the proper stiffness in proportion to the load, as the load varies. In other words, I provide a spring structure which is soft at the minimum load upon the vehicle chassis, and stiff at the maximum load, providing uniform flexibility of action between the extremes. The spring device, in effect, tends to remain at the same overall length regardless of the variations in the load.

A further important object of the invention is to provide a resilient mounting which will promote uniform convenience and comfort in connection with the use of the vehicle, regardless of variations in load upon the chassis of the vehicle.

A still further object of the invention is to provide means of the above mentioned character which will provide a uniform resiliency in the mounting of the chassis, regardless of variations in the load upon the chassis.

Other objects and advantages of the invention will be apparent during the course of the following description.

In the accompanying drawings, forming a part of this application, and in which like numerals are employed to designate like parts throughout the same, Figure 1 is a central vertical longitudinal section through a resilient mounting device embodying the invention, Figure 2 is a horizontal section taken on line 2—2 of Figure 1, Figure 3 is a vertical section taken on line 3—3 of Figure 2, Figure 4 is a similar view taken on line 4—4 of Figure 2, Figure 5 is a plan view of the device as shown in Figure 1, Figure 6 is a horizontal section taken on line 6—6 of Figure 1, Figure 7 is an enlarged fragmentary vertical sectional view showing portions of the top end of the device as shown in Figure 1, Figure 8 is a horizontal section taken on line 8—8 of Figure 7, and, Figure 9 is a fragmentary vertical sectional view showing the application of the device to a conventional front wheel suspension mechanism of an automobile.

In the drawings, where for the purpose of illustration is shown a preferred embodiment of my invention, the numeral 15 designates generally a resilient mounting device constructed in accordance with my invention, and including a lower cylinder 16, having a smooth inner bore, and provided at its upper end with a radially inwardly projecting annular flange 17, integral therewith, and forming a stop shoulder. The lower end of the cylinder 16 is externally screw threaded, as at 18, for engagement with an internally screw threaded annular skirt 19 of a bottom cap or end 20. A suitable gasket 21 is preferably arranged between the inner face of the cap 20 and the lower end of the cylinder 16, as shown. The cap 20 is further provided upon its inner face with an upstanding annular shoulder 22, integral therewith, and upon its lower face with a pair of opposed spaced lugs or knuckles 23, having aligned apertures 24.

The device 15 further comprises an upper cylinder 25, mounted to telescope within the lower cylinder 16, as shown, and extending slidably through a bore 26 of the flange 17. The lower end of the cylinder 25 is screw threaded as at 27, for the reception of nuts 28 and 29, between which is clamped an upper seal 30. Nuts 31 and 32 also are mounted upon the lower screw threaded end of the cylinder 25 and have clamped between them a lower seal 33. The cylinder 25 has an upper end 34, integral therewith, and provided upon its inner face with a depending annular boss or shoulder 35, and upon its top face with a marginal upstanding annular flange 36, upon which is mounted the upper flat end 37 of a depending cylindrical sleeve or shield 38, which extends below the flange 17, at all relative positions of the lower and upper cylinders 16 and 25. The purpose of the shield 38 is to prevent stones, sand, and the like, from entering between the cylinders 16 and 25, at the flange 17. The end 34 is further provided upon its upper face with a pair of upstanding opposed spaced lugs or knuckles 39, having aligned apertures 40. The lugs 39 are in longitudinal alignment with lugs 23, and the axes of the apertures 40 are parallel to and in longitudinal alignment with the axes of the apertures 24. The end 34 is further provided upon its lower face and radially outwardly of the annular boss 35 with a depending annular inner sleeve or cylinder 41, which extends to a point near and above the lower end of the cylinder 25, and which is open at its lower end, as shown.

The end 34 has a central screw threaded opening 42, within which is rigidly secured the top screw threaded end of a depending cylindrical barrel 43, which extends substantially to the lower end of the upper cylinder 25, Figure 1. The barrel 43 is provided near its top end with an internal horizontal web 44, having axial ports or passages 45, and is further provided between the web 44 and end 34 with radial ports 46. A screw threaded plug 47 is rigidly secured within the top end of the barrel 43, as shown, and has a lower screw threaded socket 48 to receive the upper screw threaded end of a depending cylindrical narrow tube or valve element 49, which extends substantially to the bottom end of the cylinder 25, and has its bottom end open. The narrow tube 49 is concentric with the barrel 43, and extends for the full length of the barrel and through a central opening 50 of the web 44. An inner chamber 51 is formed by the barrel 43, plug 47 and web 44, Figure 1, and the tube 49 is provided near its top end, and adjacent to the ports 46, with radial ports 52, which communicate with the chamber 51. The tube 49 is further provided at a point near and spaced above its bottom end with additional radial ports 53, for a purpose to be described.

A floating plunger or piston 54 is mounted within the inner cylinder 41 and between the inner cylinder and barrel 43, as shown, and this floating piston is adapted to reciprocate vertically within the inner cylinder. The floating plunger 54 has inner and outer annular depending skirts 55 and 56 providing sufficient bearing contact with the barrel 43 and inner cylinder 41, respectively, and the floating piston also includes a top flat end 57, integral therewith. Mounted upon the end 57 is a seal 58 having inner and outer glands 59 and 60, to seal against the barrel 43 and inner cylinder 41, respectively. Mounted within the piston end 57 is a normally closed downwardly opening check valve 61, having a strong spring 62 to bias it closed. An outer main expansible coil spring 63 is mounted within the cylinders 16 and 25, and extends between the cylinder 25 and inner cylinder 41, as shown. The top end of the main spring 63 contacts the end 34, and the bottom end of the main spring contacts the end 20, outwardly of the shoulder 22. The spring 63 is under an initial tension, or partly compressed, when mounted within the device 15, even when the cylinders 16 and 25 are fully extended, and the nut 28 is contacting the flange 17. An inner auxiliary expansible coil spring 64 is arranged within the inner cylinder 41, as shown, and extends inside the skirt 56 and has its upper end contacting the end 57 of floating piston 54. The lower end of the spring 64 contacts the cap 20, inwardly of the annular shoulder 22, and the spring 64 is disposed inside of and concentric with spring 63, as shown. When the cylinders 25 and 16 are fully extended axially, and the floating piston 54 is in its uppermost position, there is no initial tension on the auxiliary spring 64, and such spring just contacts the cap 20 and end 57.

The cap 20 is provided with a central screw threaded opening 65, within which is rigidly secured the bottom screw threaded end 66 of an upstanding cylindrical tubular stem 67, which extends concentrically into the lower end of the barrel 43, and provided at its top end and within the barrel 43 with a cylindrical head or plunger 68, adapted to reciprocate within the barrel. The tubular stem 67 is provided near its lower end and adjacent to the inner face of cap 20 with radial ports 69. The bottom end of the barrel 43 is internally and externally screw threaded, Figure 1, for the reception of an inner nut 70 and an outer screw threaded cap 71, as shown, and a seal or packing 72 is clamped between nut 70 and cap 71 to form a seal against the periphery of the tubular stem 67. An elongated narrow needle valve 73 extends through the tubular stem 67 and has a bottom screw threaded head 74, rigidly secured within the bottom end of the tubular stem, as shown, and surrounding the needle valve 73 within the tubular stem 67 is an annular elongated passage 75. The needle valve extends upwardly and into the narrow tube 49 or valve element, wherein it has a close sliding fit, and in the relative positions of the cylinders 16 and 25, shown in Figure 1, the top tapered end 76 of the needle valve is arranged substantially at the radial ports 53 of the tube 49, so that such ports are wholly or partially uncovered, Figures 3 and 4.

As best shown in Figures 3 and 4, the plunger 68, carried by the tubular stem 67 is provided with an annular group of inclined generally axial ports 77. The lower ends of the ports 77 extend through the bottom face of the plunger, near the periphery of the plunger, and the top ends of the ports are arranged radially inwardly of the bottom ends, Figure 3. The plunger 68 is provided in its top face with a central screw threaded recess 78 leading into a central bore 78', slidably receiving the tube 49, and the recess 78 receives a compressible washer or seal 79 and a tubular nut 80 having a radial flange 81. A flat circular plate valve 82 is mounted upon the top flat face of the plunger 68, and is of sufficient diameter to cover the top ends of the ports 77. A compressible coil spring 83 surrounds the nut 80 between the flange 81 thereof and the plate valve, and serves to bias the plate valve 82 against the top face of the plunger for covering the ports 77. The plunger 68 is further provided with a second annular group of generally axial inclined ports 84, and these ports 84 are circumferentially spaced between the ports 77 and cross the ports 77, Figures 3 and 4, but do not intersect such ports. The ports 84 have their upper ends extending through the top face of the plunger 68 and arranged near the periphery of the plunger, and their bottom ends are spaced radially inwardly of their top ends and in substantial alignment with the top ends of the ports 77. The plunger 68 is provided in its bottom face and surrounding the integral tubular stem 67 with an annular recess 85, having a flat bottom 86. The bore of the tubular stem 67 extends upwardly to a shoulder 87, approximately at the axial center of the plunger 68, where it leads into the bore 78', and an annular passage 75' is formed between the tubular stem 67 and the tube 49, Figures 3 and 4, and this passage 75' extends from the shoulder 87 to the lower end of the tube 49, Figure 1, and into the passage 75. The tube 49, of course, extends through tubular nut 80, bore 75', and into the tubular stem 67, as shown, and is adapted to reciprocate relative to stem 67. Inclined generally radial ports 88 are formed in the bottom 86 of recess 85 and lead into the top closed end of the passage 75, Figure 3. A valve or plate 89 is mounted within the recess 85, and is adapted to cover the bottom ends of the inclined ports 88, Figure 3, and is urged into contact with the bottom 86 by means of an expansible coil spring 90, surrounding the tubular stem 67. The spring 90 has its upper end contacting the valve plate 89 and its bottom end contacting a large flat washer 91 supported against downward axial movement upon the stem 67, by means of a snap ring or shoulder 92. A valve plate 93 is arranged to cover the bottom ends of the ports 84, and has a cylindrical tubular hub portion 94 which extends into the recess 85 to pilot the valve plate 93. A strong compressible coil spring 95 has its top end engaging against the valve plate 93 to urge it against the bottom face of the plunger 68, and its bottom end engages the washer 91, Figure 3.

In Figure 9, I have illustrated the application of the resilient mounting device 15 to a conventional front wheel suspension mechanism of an automobile. In Figure 9 the numeral 96 designates a rigid transverse extension or arm, forming a part of the chassis main frame, and having an upstanding tubular extension or dome 97, near its outer end. A hinge knuckle 98 is provided at the top of the dome 97, and pivotally connected with the knuckle 98 is a horizontal vertically swingable arm or link 99. A vertical link or bar 100 has its top end pivotally connected to the outer end of link 99 at 101, and its lower end pivotally connected to a vertically swingable yoke 102, at 103. The inner end of the swingable yoke 102 is pivotally connected to the bottom side of extension 96, at 104. The link 100 is provided near its vertical center with an apertured lug or sleeve 105, pivotally connected with knuckles 106 of a plate 107, by means of a pin 108. The plate 107 carries the usual tapered spindle 109 upon which the vehicle wheel is rotatably mounted. The yoke 102 has rigidly secured to it a plate 110 having an upstanding apertured knuckle 111. This is all conventional construction in a standard front wheel suspension mechanism. The resilient mounting device 15, as shown in Figure 9, is arranged within the dome 97 and extends between the top end of the dome and the plate 110. The knuckles or lugs 39 are pivotally connected to the dome 97 by means of a transverse pin 112, as shown, while the knuckles or lugs 23 are pivotally connected to the knuckle 111, by means of a pin 113. The device 15 thus occupies the space usually occupied by the conventional coil spring. Figure 9 illustrates one mounting or application of my resilient mounting device 15, and it is to be understood that the device is to be used with various types of front and rear wheel suspension mechanisms. It is desirable to use four of the devices 15, upon an automobile to be provided with the resilient mounting in accordance with this invention, one of the devices being arranged adjacent to each wheel.

The lower cylinder 16 is maintained filled with oil or other suitable fluid to approximately the level L, Figure 1, and it is obvious that under certain conditions, to be explained, the oil may enter the annular passage 75, ports 88, 84 and 87, the barrel 43, chamber 51 and the space or chamber between end 34 and floating piston 54, as well as the tube 49. These elements constitute the confines of the hydraulic system of the device, the other space within the device being empty.

The operation of the resilient mounting device is as follows:

When the device 15 is applied to the automobile as shown in Figure 9, the cylinders 16 and 25 will assume the relative positions shown in Figure 1. Thus, in assembly upon the automobile, the telescoping cylinders 16 and 25 are never completely extended. The position shown in Figure 1 corresponds to the installed position of the device upon an automobile, with the minimum load applied to the chassis; that is, there are no passengers in the automobile and the car is at rest. Under these conditions, the top end of the needle valve 73 projects into the tube 49 to a point adjacent to the ports 53 thereof, and these ports are partly or wholly uncovered. The spring 63 is under an initial tension, as stated, and the spring 64 is under a very little tension, as shown in Figure 1.

Assuming that the vehicle is traveling over a road, carrying one or more passengers, there will be constant relative axial movement between the cylinders 16 and 25, since no road is perfectly level, and the ports 53 will be covered, since the weight of the passengers has further telescoped the cylinders 16 and 25. Each time the vehicle wheel strikes an irregularity in the roadway, the lower cylinder 16 will further telescope over the upper cylinder 25. This will of course compress the main spring 63 and also the auxiliary spring 64. It is preferred that the inner spring be designed with a much higher rate than the main spring 63, so that its stiffness increases much more rapidly under compression than the outer main spring 63. So long as the telescoping action of the cylinders 16 and 25 is insufficient to cause the needle valve 73 to close the ports 53, continuous slight reciprocation of the plunger 68 within the barrel 43 will constantly pump oil from the reservoir in the bottom of cylinder 16, through the barrel 43, ports 45, chamber 51, ports 52, tube 49, and ports 53, where the oil will enter the annular passage 75, and pass out through the ports 69, back to the reservoir in the cylinder 16. Since the oil is thus bypassed through the ports 53 back to the cylinder 16, no downward movement is imparted to the floating piston 54 and no differential tension is applied to the inner auxiliary spring 64. If while driving over the road with passengers, the load upon the chassis is suddenly increased, such as by the striking of a bump, the cylinders 16 and 25 are further instantly telescoped. Because of the passengers, the needle valve 73 has completely covered the ports 53, as stated. When the bump occurs, and the plunger 68 reciprocates, it pumps oil from the lower cylinder 16 upwardly through the barrel 43, ports 45, chamber 51, ports 46, and into the chamber or space behind the floating piston 54. The oil cannot now bypass back to the cylinder 16 through the ports 52, since the ports 53 are closed. The floating piston 54 is now forced downwardly by the oil, as the plunger 68 reciprocates, placing the inner auxiliary spring 64 under an increasing differential tension, and this tension increases until a balance is reached between the combined tensions of springs 63 and 64 and the increased load. When this point is reached, and the action of the device is fast, the cylinders 16 and 25 are forced axially apart by the action of the springs 63 and 64, until the ports 53 are again uncovered by the needle valve, and the plunger 68 again circulates oil from the lower cylinder 16, through the barrel 43, through the ports 52 and 53, and through the passage 75, back to the lower cylinder. However, at the moment when the increased load was placed upon the device, the action of the floating cylinder 54, in placing the increased tension upon the inner auxiliary spring 64, enabled the device 15 to increase the expanding force in resistance to the increased load, and in effect to tend to remain at the same over-all length. When the minimum load is upon the device and the ports 53 are uncovered, the device is relatively soft and will provide a comfortable ride at the minimum load condition.

During the reciprocation or pumping action of the plunger 68 within the barrel 43, each time the plunger 68 moves upwardly, Figure 1, it tends to produce a vacuum below the plunger within the bottom of the barrel, provided the liquid is not supplied into the bottom of the barrel to keep up with the rising plunger. In normal operation, when the reciprocation of the plunger 68 is not rapid, the flow of the liquid into the bottom of the barrel beneath the plunger is sufficient to prevent the formation of such a vacuum. The formation of a vacuum beneath the plunger would be disadvantageous in as much as it would interfere with the free reciprocation of the plunger. In the normal operation, as the plunger moves upwardly, the valve plate 89 will open, and oil will be drawn into the barrel 43 below the plunger 68, through the ports 69, passage 75 and ports 88, thereby preventing the formation of the vacuum below the plunger. As the oil is thus drawn into the barrel below the plunger 68 and fills the space below the plunger, each time the plunger moves downwardly, the spring 83 will yield and permit the plate valve 82 to uncover the ports 77 and some of the oil will pass upwardly through the ports 77 into the barrel above the plunger 68. Since the operation of the plunger is continuous, and the action of the valve 82 is automatic during the reciprocation of the plunger, the oil in the barrel 43 is pumped upwardly through the vertical restricted ports 45, chamber 51, ports 46 and into the space above the floating piston 54, as previously stated. During this normal operation of the device the valve 93 remains seated and covers the lower ends of the ports 84. By the normal operation is meant that the plunger 68 does not move upwardly too rapidly, and the liquid will pass through the restricted passage and enter the barrel beneath the plunger to prevent the formation of the vacuum beneath the plunger.

When the device has an abnormal operation, occurring when the plunger moves upwardly rapidly, then upon the upward rapid movement of the plunger, the valve 86 opens and the valve 93 also opens, since there is excessive pressure in the barrel above the plunger, for the restricted passage will then prevent the return of the liquid into the barrel beneath the plunger sufficiently fast to follow the plunger and prevent the formation of the vacuum. Since the valve 93 opens upon the rapid upward movement of the plunger, some of the oil is returned to the barrel beneath the plunger and the formation of the vacuum is eliminated. The spring 95 is stronger than the spring 90, and therefore the valve 93 will open only upon the rapid upward movement of the plunger.

The valve 61 is provided as a safety feature, and under conditions of extreme excessive load, this valve will open downwardly and bypass oil from behind the floating piston 54 directly to the cylinder 16, before the floating piston can move downwardly and out of the cylinder 41, and before the springs 64 and 63 are compressed too much or other damage done.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:

1. A resilient mounting device for vehicles, comprising upper and lower telescoping casings, an inner cylinder secured to the upper casing, springs mounted within the casings and disposed inwardly and outwardly of the inner cylinder, a piston mounted within the cylinder and engaging the inner spring, a substantially vertical barrel arranged within the inner cylinder and having an opening near its upper end leading into the inner cylinder and secured to the upper cylinder, an upper substantially vertical tube arranged within the barrel and secured to the upper cylinder and having an opening near its upper end leading into the barrel, the upper tube being provided near its lower end with an opening, a plunger mounted within the barrel and having an opening to slidably receive the upper tube, a lower substantially vertical tube projecting into the barrel and receiving the lower end of the upper tube and forming therewith a passage, the lower tube carrying the plunger and the passage leading to the opening in the upper tube near its lower end, the lower tube having its lower end secured to the lower casing and provided near such lower end with an opening, the plunger having a port leading into the passage and extending to its lower face, a check valve to cover the port, said plunger having a second port passing through its upper and lower faces, a check valve to cover the upper end of the second port, and a valve element arranged within the second tube and secured at its lower end to the lower casing and having a part to cover and uncover the lower opening in the first tube.

2. A resilient mounting device for vehicles, comprising upper and lower telescoping casings, an inner cylinder secured to the upper casing, springs mounted within the casings and disposed inwardly and outwardly of the inner cylinder, a piston mounted within the cylinder and engaging the inner spring, a substantially vertical barrel arranged within the inner cylinder and having an opening near its upper end leading into the inner cylinder and secured to the upper cylinder, an upper substantially vertical tube arranged within the barrel and secured to the upper cylinder and having an opening near its upper end leading into the barrel, the upper tube being provided near its lower end with an opening, a plunger mounted within the barrel and having an opening to slidably receive the upper tube, a lower substantially vertical tube projecting into the barrel and receiving the lower end of the upper tube and forming therewith a passage, the lower tube carrying the plunger and the passage leading to the opening in the upper tube near its lower end, the lower tube having its lower end secured to the lower casing and provided near such lower end with an opening, the plunger having a port leading into the passage and extending to its lower face, a check valve to cover the port, said plunger having a second port passing through its upper and lower faces, a check valve to cover the upper end of the second port, said plunger having an auxiliary port passing through its upper and lower faces, a check valve to cover the lower end of the auxiliary port, and a valve element arranged within the second tube and secured at its lower end to the lower casing and having a part to cover and uncover the lower opening in the first tube.

3. A resilient mounting device for vehicles, comprising first and second casings having their inner ends telescoping and having outer heads, a spring extending longitudinally within the casings and having one end bearing against the outer head of the second casing, a piston arranged within the first casing near the outer head of the first casing and forming with such head a space for receiving fluid pressure, the piston bearing against the opposite end of the spring and having an axial opening, a barrel arranged within the first casing and extending axially of the first casing and attached to the outer head of the first casing and passing through the axial opening of the piston, said barrel being provided near its outer end with an opening in communication with said space, a tube secured to the outer head of the second casing and extending axially within the second casing and having an opening near its outer end which leads into the second casing, the tube extending into the inner end of the barrel, a plunger mounted within the barrel and secured to the tube, said plunger having a passage which leads into the tube and provided with a port passing through one end of the plunger and leading into the passage, a check valve element to cover the port, said plunger having a port passing through its opposite ends, a check valve element to cover the last named port, a second tube extending axially within the first casing and having an opening near its outer end in communication with said space, the second tube slideably receiving the plunger thereon and having its inner end extending into the inner end of the first tube, the second tube being provided in its side and near its inner end with opening means to communicate with said passage of the plunger, and a needle valve having one end secured to the outer head of the second casing and mounted within the first tube and forming with the first tube a passage which passage is in communication with the passage of the plunger, the needle valve extending into the inner end of the second tube and adapted to cover and uncover the opening means formed in the side of the second tube.

4. A resilient mounting device for vehicles, comprising first and second casings having their inner ends telescoping, a spring extending axially within the casings and having one end bearing against the second casing, a piston mounted within the first casing to move axially therein and form with the first casing a space for receiving fluid pressure, said piston bearing against the opposite end of the spring and having an axial opening, a barrel passing through the axial opening of the piston and extending axially within the first casing and having an opening in communication with said space, means to secure the barrel in place within the first casing, a tube extending axially within the second casing and attached thereto and having an opening which leads into the second casing, the tube extending into the inner end of the barrel, a plunger mounted within the barrel and secured to the tube, said plunger having an axial opening and an axial passage which leads into the tube, said plunger being provided with a port passing through one end of the plunger and leading into the axial passage, a check valve element to cover the port, said plunger having a port passing through its opposite ends, a check valve element to cover the last named port, a second tube extending axially within the first casing and having an opening in communication with said space, the second tube being slideable within the axial opening of the plunger and having its inner end extending into the inner end of the first tube, the second tube being provided in its side and near its inner end with opening means to communicate with said passage of the plunger, means for retaining the second tube in place within the first casing, and a needle valve secured to the second casing and mounted within the first tube and forming with the first tube a passage which is in communication with the passage of the plunger, the needle valve extending into the inner end of the second tube and adapted to cover and uncover the opening means formed in the side of the second tube.

5. A resilient mounting device for vehicles, comprising first and second casings having their inner ends telescoping, a spring extending axially within the casings and having one end bearing against the second casing, a piston mounted within the first casing to move axially therein and form with the first casing a space for receiving fluid pressure, said piston bearing against the opposite end of the spring and having an axial opening, a barrel extending axially within the first casing and slideably mounted within the axial opening of the piston, said barrel having an opening in communication with said space, means to secure the barrel in place within the first casing, means to withdraw fluid from the second casing and introduce the same under pressure into the barrel including a plunger slideably mounted within the barrel, and means to by-pass the fluid under pressure from the barrel back to the second casing including a valve element secured to the second casing for movement therewith.

6. A resilient mounting device for vehicles, comprising first and second casings having their inner ends telescoping, a spring extending axially within the casings and having one end bearing against the second casing, a piston mounted within the first casing to move axially therein and form with the first casing a space for receiving fluid pressure, said piston bearing against the opposite end of the spring and having an axial opening, a barrel extending axially within the first casing and slideably mounted within the axial opening of the piston, said barrel having an opening in communication with said space, means to secure the barrel in place within the first casing, means to withdraw fluid from the second casing and introduce the same under pressure into the barrel including a plunger slideably mounted within the barrel, said plunger having a passage, and means to by-pass the fluid under pressure from the barrel back to the second casing including a tube having communication with said space and leading into the passage of the plunger, said tube being provided adjacent to the passage with opening means communicating with the passage of the plunger, and a valve element secured to the second casing and extending into the tube to cover and uncover the opening means.

7. In a resilient mounting device for vehicles, a barrel, a plunger slideably mounted within the barrel and provided with an axial opening and an axial passage, said plunger having a port leading into the axial passage and extending through the suction end of said plunger, a valve element to cover the port, said plunger having a port passing through the suction and compression ends of the plunger, a valve element to cover the last named port, means to supply fluid to the axial passage, a by-pass tube mounted within the barrel and extending through the axial opening of the plunger and having opening means in its side for communication with the axial passage, and a valve element to cover and uncover the opening means.

8. A resilient mounting device for vehicles, comprising first and second casings having their inner ends telescoping, a spring extending axially within the casings and having one end bearing against the second casing, a piston mounted within the first casing to move axially therein and forming with the first casing a space for receiving fluid pressure, said piston bearing against the opposite end of the spring, means for withdrawing the fluid from the second casing and supplying the same under pressure to said space, said means including a barrel extending axially of the first casing and secured thereto, a plunger within the barrel and connected with the second casing and having an axial passage and a port in communication with the axial passage and extending through the suction end of the plunger, a valve element to cover the port, said plunger having a second port passing through the suction and compression ends of the plunger, a valve element to cover the second port, and means to by-pass the fluid pressure from the space to the passage of the plunger including a tube mounted within the barrel and leading into said axial passage and provided in its side with opening means, and a valve element connected with the second casing and extending into the tube to cover and uncover the opening means.

9. A resilient mounting device for vehicles, comprising first and second casings having their inner ends telescoping and including outer heads, an inner cylinder extending axially within the first casing and secured to its outer head, springs extending axially within the casings and disposed inwardly and outwardly of the inner cylinder, a piston mounted within the inner cylinder and engaging the inner spring and having an axial opening, the piston forming with the outer head of the first casing a space, a barrel extending axially within the cylinder and secured to the outer head of the first casing and having an opening in communication with said space, a first tube extending axially within the barrel and secured to the outer head of the first casing and having an opening in its side which communicates with the barrel near such outer head, a plunger mounted within the barrel and having an opening to slideably receive the first tube, the first tube having an opening in its side adjacent to the plunger, a second tube receiving the inner end of the first tube and having the plunger secured thereto, the second tube extending axially of the second casing and secured to the outer end of the second casing, said plunger having an axial passage, the second tube being provided near its outer end with an opening leading into the second casing, the plunger having a port leading into the axial passage and extending through the suction end of the plunger, a check valve to cover the port, said plunger having a second port passing through its suction and compression ends, a check valve to cover the second port, and a valve element arranged within the second tube and secured to the outer head of the second casing and having its inner end arranged to cover and uncover the opening of the first tube adjacent to the plunger.

OLIVER K. HOBBS.

REFERENCES CITED

The following references are of record in the file of this patent:

UNITED STATES PATENTS

| Number | Name | Date |
|---|---|---|
| 1,055,734 | Funk | Mar. 11, 1913 |
| 1,628,749 | Samuels | May 17, 1927 |
| 2,150,576 | Bell | Mar. 14, 1939 |
| 2,186,011 | Deport | Jan. 9, 1940 |
| 2,342,381 | Thornhill | Feb. 22, 1944 |
| 2,436,573 | Heynes | Feb. 24, 1948 |

FOREIGN PATENTS

| Number | Country | Date |
|---|---|---|
| 350,421 | Great Britain | June 10, 1931 |